United States Patent
He (10) Patent No.: US 7,005,404 B2
(45) Date of Patent: Feb. 28, 2006

(54) SUBSTRATES WITH SMALL PARTICLE SIZE METAL OXIDE AND NOBLE METAL CATALYST COATINGS AND THERMAL SPRAYING METHODS FOR PRODUCING THE SAME

(75) Inventor: Ting He, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 472 days.

(21) Appl. No.: 09/912,223

(22) Filed: Jul. 24, 2001

(65) Prior Publication Data

US 2002/0081243 A1 Jun. 27, 2002

Related U.S. Application Data

(63) Continuation-in-part of application No. 09/742,697, filed on Dec. 20, 2000.

(51) Int. Cl.
- *B01J 23/00* (2006.01)
- *B01J 21/00* (2006.01)
- *C23C 4/00* (2006.01)
- *C23C 4/08* (2006.01)
- *C23C 4/10* (2006.01)

(52) U.S. Cl. ............... 502/325; 502/240; 502/241; 502/242; 502/243; 502/244; 502/245; 502/258; 502/259; 502/260; 502/261; 502/262; 502/302; 502/303; 502/304; 502/324; 502/326; 502/327; 502/330; 502/331; 502/332; 502/333; 502/334; 502/335; 502/337; 502/339; 502/344; 502/346; 502/347; 502/348; 502/352; 427/446; 427/453; 427/455; 427/456

(58) Field of Classification Search ......... 502/240–245, 502/258–262, 302, 303, 304, 324–327, 330, 502/331–335, 337, 339, 344, 346–348, 352; 427/446, 453, 455, 456

See application file for complete search history.

(56) References Cited

U.S. PATENT DOCUMENTS

| | | | |
|---|---|---|---|
| 4,687,510 A | * 8/1987 | Cheney et al. | 75/331 |
| 4,871,703 A | * 10/1989 | Beaver et al. | 502/101 |
| 5,527,633 A | * 6/1996 | Kawasaki et al. | 429/30 |
| 5,581,588 A | * 12/1996 | Andresen | 376/305 |
| 5,645,930 A | * 7/1997 | Tsou | 428/328 |
| 5,882,723 A | * 3/1999 | Tsou | 427/125 |
| 5,980,843 A | * 11/1999 | Silversand | 423/210 |
| 6,110,537 A | * 8/2000 | Heffner et al. | 427/448 |
| 6,129,996 A | * 10/2000 | Cordy | 428/646 |
| 6,214,194 B1 | * 4/2001 | Isenberg | 205/230 |
| 6,387,539 B1 | * 5/2002 | Subramanian | 428/633 |

FOREIGN PATENT DOCUMENTS

WO    WO03/009934 A1  *  6/2003

* cited by examiner

*Primary Examiner*—Cam N. Nguyen
(74) *Attorney, Agent, or Firm*—Porter Wright Morris & Arthur LLP; Mark E. Duell, Esq.

(57) ABSTRACT

A substrate having a catalytic surface thereon characterized as a coating of metal oxide and noble metal particles in the nominal diameter size distribution range of <3 microns, and more particularly <1 micron, is produced by thermal spraying a mixture of large size particles (e.g., in a nominal size distribution range of >10 micrometers) of hydroxides, carbonates or nitrates of the metals: cerium, aluminum, tin, manganese, copper, cobalt, nickel, praseodymium or terbium particles; and hydroxides, carbonates or nitrates of the noble metals: ruthenium, rhodium, palladium, silver, iridium, platinum and gold onto the substrate. The coating adheres to the surface and provides desirable catalyst properties.

26 Claims, 5 Drawing Sheets

SUBSTRATES WITH SMALL PARTICLE SIZE METAL OXIDE AND NOBLE METAL CATALYST COATINGS AND THERMAL SPRAYING METHODS FOR PRODUCING THE SAME

CROSS-REFERENCE TO RELATED APPLICATIONS

This application is a continuation-in-part of my co-pending U.S. application for patent Ser. No. 09/742,697 filed on Dec. 20, 2000, entitled "Method for Enhancing the Surface of a Substrate and Catalyst Products Produced Thereby," the disclosure of which is hereby incorporated by reference as if set out in full herein.

FIELD OF THE INVENTION

The invention relates to a method of coating a substrate with a metal oxide (such as ceria ($CeO_2$)) and a noble metal catalyst (such as palladium or platinum) by thermal spraying a mixture of large size metal component precursor particles (such as cerium carbonate ($Ce_2(CO_3)_3$)) mixed with large size noble metal precursor particles (such as palladium hydroxide ($Pd(OH)_x$)).

BACKGROUND OF THE INVENTION

Prior art disclosures of processes for the deposition of ceria particles on a substrate include U.S. Pat. No. 5,063,193 to Bedford et al. which discloses a wash coat of high surface area ceria particles and the preparation thereof in which cerium carbonate is converted to ceria via chemical reactions and calcination; U.S. Pat. No. 6,051,528 to Brezny which discloses a wash coat created by dissolving cerium carbonate to form cerium acetate which is then treated by spray pyrolysis to form a ceria powder; and U.S. Pat. No. 5,989,648 to Phillips which discloses the plasma generation of supported metal catalysts. The referenced patents do not disclose the use of large particle precursors that decompose in a plasma spray to smaller particles that form a catalyst coating on the target substrate.

In a preferred embodiment, the present invention injects a mixture of large size (approximate nominal diameter distribution range >10 micrometers) metal component precursor particles and large size (approximate nominal diameter >10 micrometers) noble metal component particles into a thermal spray to produce a catalyst coating of metal oxide/noble metal having a nominal particle size diameter distribution in the range of <5 microns, particularly <2 or 3 microns, and more preferably <1 micron. (In the ranges stated herein, a particular distribution includes approximately 90% of the particles within the parameter stated.) The invention provides, by a thermal spray process, a porous, fine particle coating of metal oxides and noble metals, having good mechanical adhesion to a substrate surface and stability properties and surface characteristics useful for catalytic reactor applications.

My previous application describes the deposition of metal hydroxides, carbonates and nitrates on a substrate by thermal spray processes. During a line of sight spray process, the precursor materials decompose and oxides are formed that adhere in a mechanically stable manner to the surface of a thin metal substrate. For example, with hydroxide, carbonate and nitrate metal compositions, the reactions respectively occur: a) $Me(OH)_x \rightarrow MeO_x + H_2O$; b) $Me(CO_3)_x \rightarrow MeO_x + CO_2$; and c) $Me(NO_3)_x \rightarrow MeO_x + N_2$.

The present invention provides an improved catalytic surface and an enhanced method in which the metal oxide precursors, preferably cerium carbonate or cerium hydroxide, become a ceria coating on a metal surface and a noble metal catalyst is deposited on the surface in the same operation. Large particle cerium carbonate is oxidized to cerium oxide, $Ce_2(CO_3)_x \cdot XH_2O \rightarrow Ce_2O_3 + 3CO_2 + XH_2O$. In the presence of air or oxygen, $Ce_2O_3$ is oxidized to $CeO_2$, namely, $Ce_2O_3 + \frac{1}{2}O_2 = 2CeO_2$. After the thermal spraying, if a substantial quantity of $Ce_2O_3$ is present on the substrate surface, an after-treatment may be applied to achieve the correct phase of $CeO_2$. In the process, the large size particles decompose, the water component vaporizes and a ceria and noble metal catalyst coating on the substrate results. More particularly the invention relates to a method of thermally spraying catalyst precursor materials directly onto a substrate surface and the catalyst substrates formed thereby as a result of the pyrolysis reactions occurring in the process. The invention is particularly useful in the deposition of a catalyst material on surfaces of components used in micro-component reaction chamber assemblies.

My referenced parent application for patent describes characteristics and properties of prior art processes and coatings. In the present invention, thermal spraying of large particles produces a coating of small particle size and high surface area on a substrate.

SUMMARY OF THE INVENTION

In the invention, a thermally sprayed coating on a substrate yields a thin layer of a catalyst coating with small particle size and high surface area. In an embodiment, the method is applied to form a catalyst coating on a channel separator element used in a micro-component heat exchanger/reactor unit used in laminar flow reactors for hydrogen production devices employed in conjunction with low power fuel cells in automotive or mobile or other equivalent applications. See U.S. application for patent Ser. No. 09/627,267 filed on Jul. 28, 2000, entitled "Multi-purpose Micro-channel Micro-component," assigned to the assignee of the present application, the disclosure of which is hereby incorporated by reference.

The overall process of forming such a micro component includes steps from substrate preparation to substrate surface modification to the application of a final coating by thermal spraying to produce a metal oxide and noble metal catalyst on the substrate. The process begins with the formation of the substrate, such as the pre-formation of folds or corrugations in a shim precursor to a wavy plate. The substrate surface is subjected to grit blasting or like treatment before or after the formation of partial folds (or fold lines) on the wavy plate. The substrate is positioned to receive the thermal spray, preferably mounted on a heat sink to maintain a low temperature. The coating mixture of cerium and noble metal precursors is applied to the substrate by a plasma spray.

The thermal sprayed coating bonds directly with the surface of the substrate. Desirable characteristics, including high porosity, high surface profile and surface area and small particle size, are beneficially achieved in the thermally sprayed coating. A catalyst precursor material, preferably a mixture of multiple materials, in the form of a particulate, powder or granule having a large particle size, for example, in a scale greater than about 10 micrometers and up to about 200 or more micrometers, is thermally sprayed onto the substrate and forms a catalyst coating that bonds to the substrate surface. The coating is formed from decomposition products of the sprayed mixture material and is characterized as a distribution of small size particles, namely in the order of less than approximately 5 microns in nominal diameter, preferably in the order of less than approximately 2 or 3 microns in nominal diameter, and more preferably in the order of less than approximately 1 micron in nominal diameter. Although the substrate may be coated sequentially in multiple layers beginning with a ceria foundation, followed by a further coating of a catalytic material, such as a noble metal, a mixture of both compositions is preferred to be thermally sprayed in the same operation. In a useful embodiment, the coated substrate is used as a flow separator/heat exchange media between alternate fluid flows in a micro-component reaction chamber, or heat exchanger.

The catalyst formed in the thermal spray process and subsequent treatment, if any, promotes a chemical reaction when a reagent fluid flows through the channels of the micro-component device. One or both sides of the wavy plate separator may be treated. In this aspect of the invention, the coating, and the enhanced surface properties thereof, also assist in the transfer of heat between facing channels in the micro-component device. In the invention, large size particles, or a mixture of large size particles comprising a catalyst precursor is flame sprayed or plasma sprayed onto a substrate to produce a small particle size coating by a pyrolysis process in which heat decomposes the sprayed material. Before thermal spraying, the substrate surface may be enhanced by methods such as grit blasting and/or chemical treatment to improve adhesion of the thermally sprayed coating to the substrate.

The invention is described more fully in the following description of the preferred embodiment considered in view of the drawings in which:

DETAILED DESCRIPTION OF THE INVENTION AND THE PREFERRED EMBODIMENT

The present invention provides a catalytic substrate surface comprising a particulate coating of a) one or more than one of cerium, aluminum, tin, manganese, copper, cobalt, nickel, praseodymium or terbium oxide and b) one or more than one of ruthenium, rhodium, palladium, silver, iridium, platinum and gold, characterized as a substantially uniform distribution over the surface of the substrate in which the coating particles are in the nominal diameter size distribution range of <5 microns, preferably, in the nominal diameter size distribution range of <2 or 3 microns. Most preferably, the coating particles are in the nominal diameter size distribution range of <1 micron; namely, in the distribution 90% of the particles have a diameter less than 1 micron. Smaller particle sizes at the surface optimize the desired characteristics of the substrate achieved by the invention. The catalytic surface coating is produced by thermal spraying a mixture of large size particles (e.g., in a nominal size distribution range of >10 micrometers up to 200 micrometers or more, limited by the nozzle spray orifice of the thermal spray) of hydroxides, carbonates or nitrates of the metals, cerium, aluminum, tin, manganese, copper, cobalt, nickel, praseodymium or terbium and the hydroxides, carbonates or nitrates of the noble metals, ruthenium, rhodium, palladium, silver, iridium, platinum and gold onto the substrate.

Figure 1A:
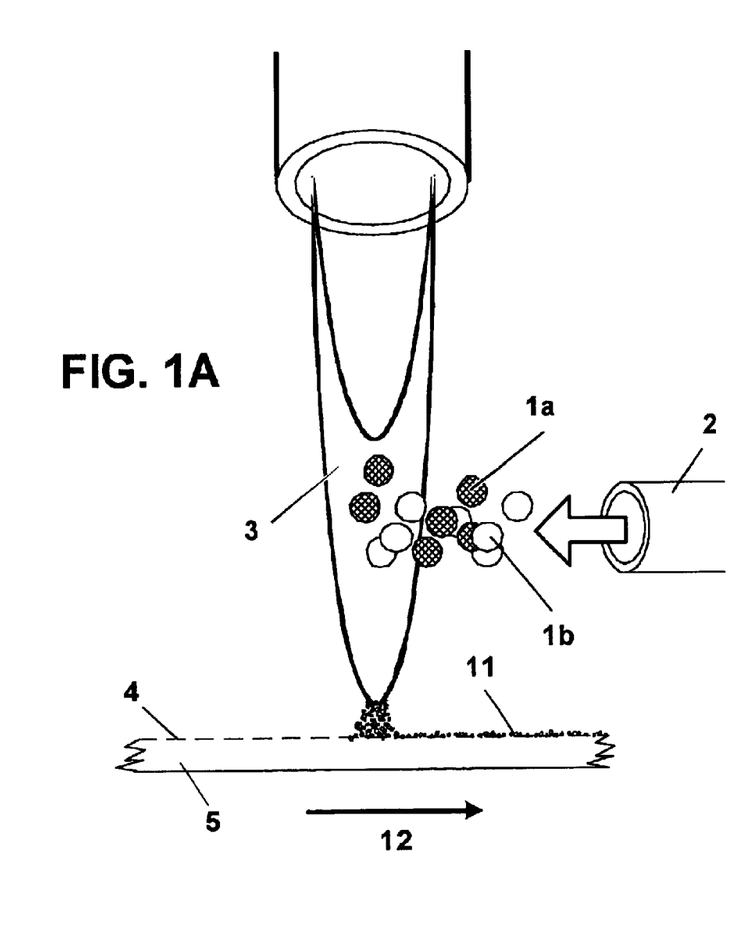
FIG. 1A is a representation of the thermal spray process (not to scale) in which a powder mixture is introduced from a single orifice into a flame or plasma directed to a substrate surface.

FIG. 1A shows a representation of the thermal spray process used in the invention. A large size particulate, granule or powder mixture of catalyst precursor compositions 1a and 1b, is introduced from orifice 2 into a flame or plasma 3 that is directed to the surface 4 of a substrate 5, such as a thin shim from which a wavy plate is formed. The mixture of catalyst precursor materials, for example, cerium hydroxide and a noble metal hydroxide, decompose to a small particle size coating 11 which provides a porous, or enhanced surface area, on the substrate surface. In a line of sight thermal spray, the materials in the mixture decompose and oxidize by pyrolysis and produce oxides that adhere to the substrate surface. For example, cerium carbonate oxidizes to ceria, $Ce_2(CO_3)_3 \rightarrow 2CeO_x + XCO_2$; palladium hydroxide oxidizes to palladium oxide, $Pd(OH)_x \rightarrow PdO_x + H_2O$; and palladium oxide reduces to palladium, $PdO_x \rightarrow Pd + XO_2$. The large size particles of the catalyst precursor compositions introduced into the flame or plasma are thermally sprayed directly onto the substrate and decompose into a coating of small size particles fixed on the substrate. Arrow 12 shows the direction of relative movement of the flame/plasma spray and the substrate. The surface area and porosity properties of the substrate surface are enhanced for use as a component of a catalytic reactors micro-component assembly.

Preferred noble metals and noble metal hydroxides, carbonates, or nitrates of the invention include ruthenium (Ru), rhodium (Rh), palladium (Pd) and silver (Ag) and iridium (Ir), platinum (Pt) and gold (Au). Preferred metals forming the metal hydroxide, metal carbonate, or metal nitrate particles capable of decomposing to a metal oxide include cerium (Ce), aluminum (Al), tin (Sn), manganese (Mn), copper (Cu), cobalt (Co) and nickel (Ni), and the rare earth metals praseodymium (Pr) and terbium (Tb).

Figure 2A:
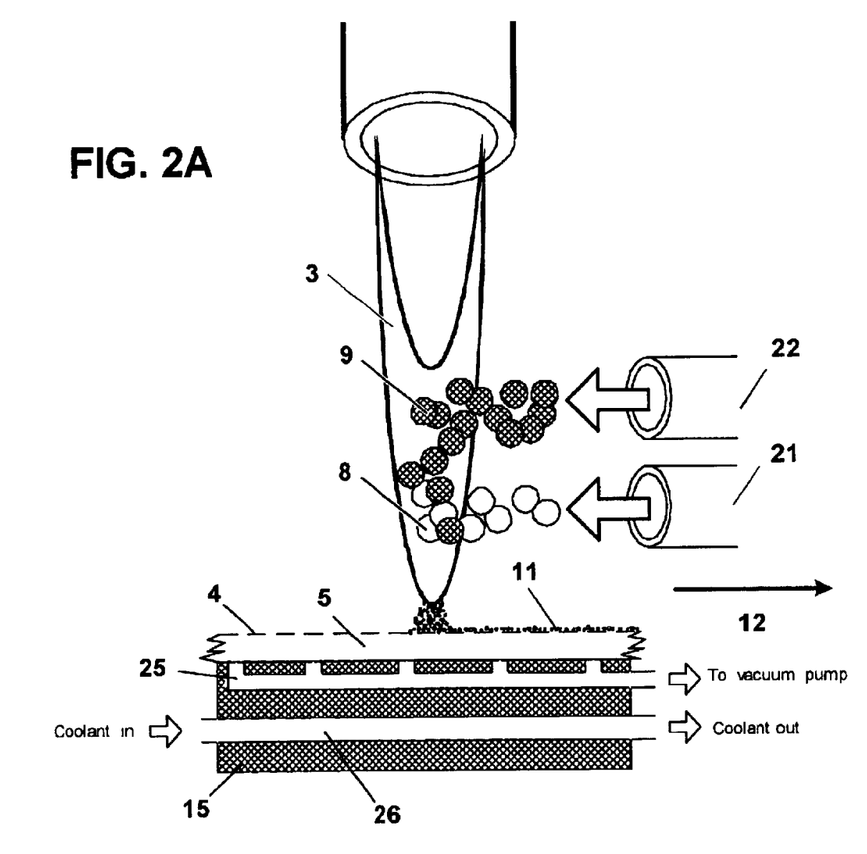
FIG. 2A is a representation of the thermal spray process (not to scale) in which separate powders are introduced, each from an associated separate orifice, into a flame or plasma directed to a substrate surface.

FIG. 2A illustrates the thermal spray process in which separate powders are introduced, each from an associated separate orifice, into a flame or plasma 3 directed to a substrate surface 4. For example, metal hydroxide, metal carbonate, or metal nitrate particles 8 may be introduced into the thermal spray 3 from orifice 21 and noble metal, and/or noble metal hydroxide, carbonate or nitrate particles 9 may be introduced into the thermal spray 3 from orifice 22. A heat sink is shown as 15 in FIG. 2A. Preferably, a heat sink, such as a copper block with a shape complementary to the substrate, whether flat or folded, is employed as a support member for the substrate in the plasma spray to absorb heat generated during the spray process. A vacuum hold down system 25 maintains the substrate in place relative to heat sink 15. Coolant channel 26 allows the flow of a cooling fluid through the heat sink to maintain the substrate at a regulated relatively low temperature (for example, at about or less than 100° C.) during the spray process.

Figure 2B:
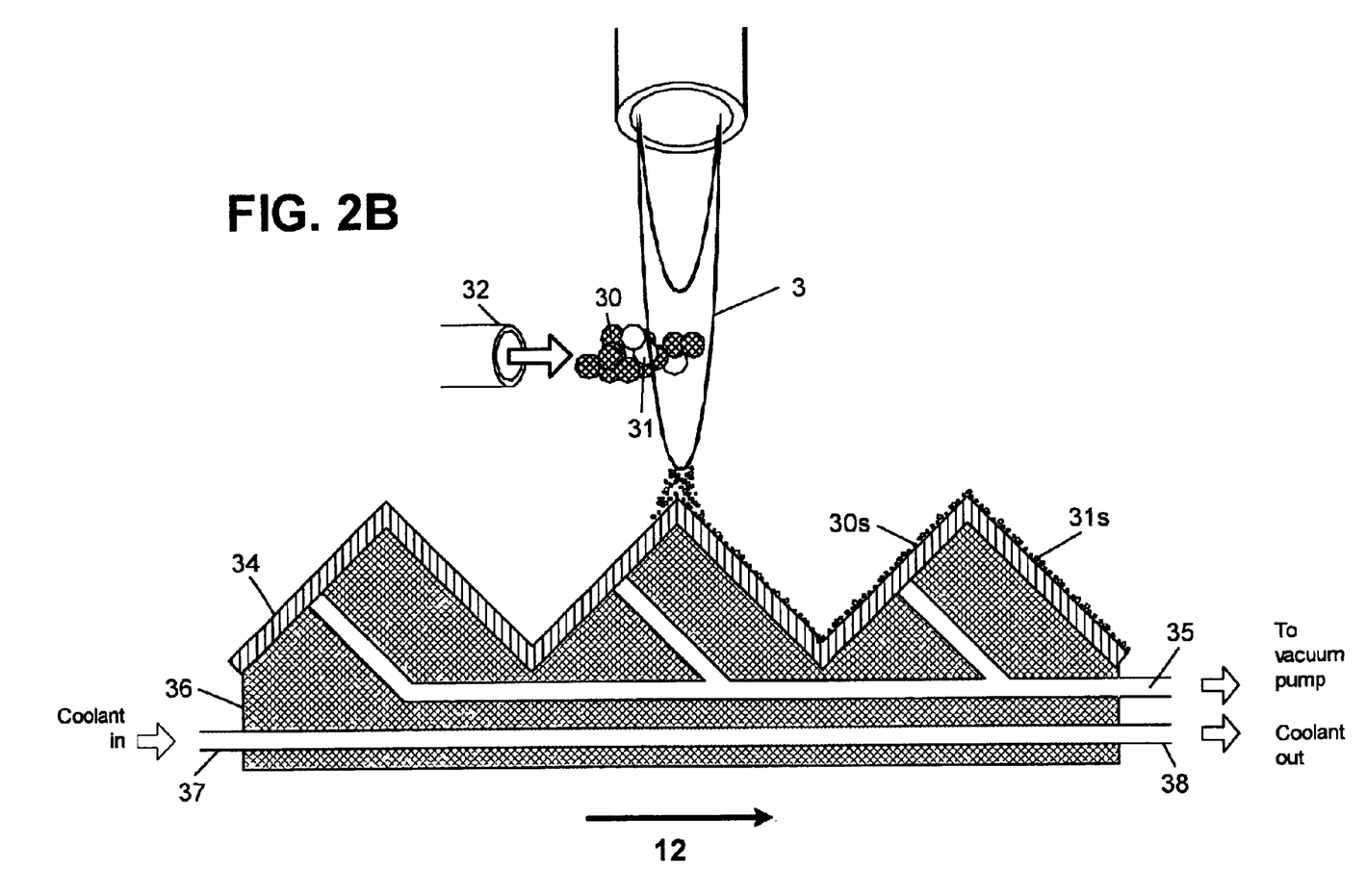
FIG. 2B is a representation of the thermal spray process (not to scale) applied to a preliminarily folded wavy plate maintained by vacuum on a supporting and complementarily shaped heat sink.

FIG. 2B shows a thermal spray process in which the mixture of oxide 30 and noble metal 31 precursor particles are introduced through a nozzle 32 into a flame or plasma source 33. In the example, a preliminarily formed shim plate 34 having folds of approximately 60° is held by a vacuum source 35 to a complimentary copper block heat sink 36. The heat sink 36 includes channels therein for the flow in 37 and out 38 of a fluid coolant, such as water ($H_2O$), through the block, to maintain the substrate at a regulated low temperature in the range of about 100° C.

Figure 3A:
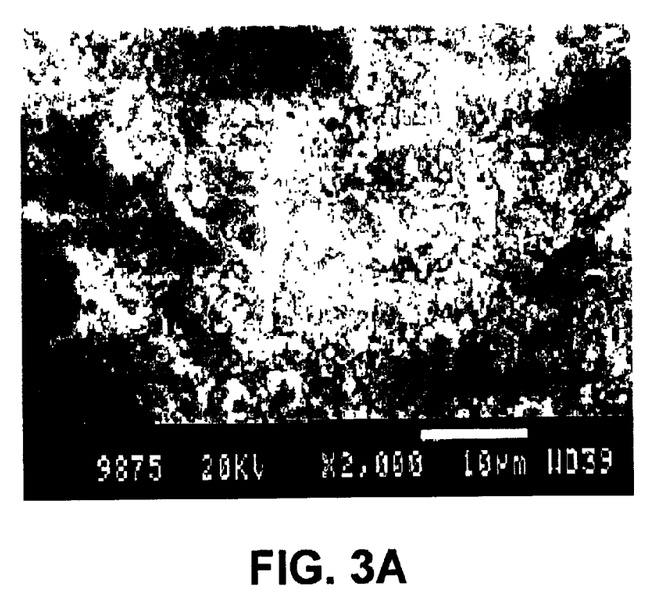
FIG. 3A is a 2000× magnified view of the surface of a metal substrate coated with a metal oxide/noble metal (ceria/palladium) catalyst.
Figure 3B:
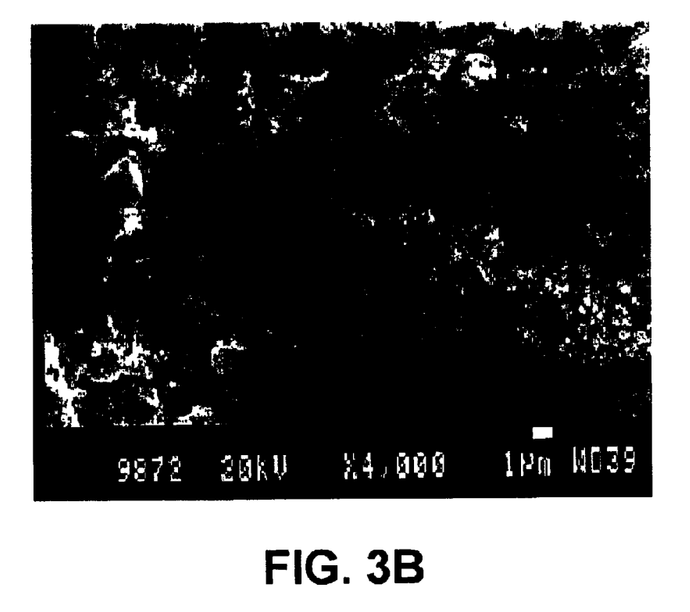
FIG. 3B is a 4000× magnified view of the surface of a metal substrate coated with a metal oxide/noble metal (ceria/palladium) catalyst.

In a cerium/palladium example depicted in FIG. 3A and FIG. 3B, the thermal spray deposits on the surface a mixture of 5% by weight of ceria 30s and 95% by weight of palladium 31s, distributed as a surface of small size particles <1 micron derived from the decomposition of the large size cerium carbonate 30 and palladium hydroxide 31 precursor particles. The relative stoiciometric proportions of the cerium carbonate and palladium hydroxide precursors introduced to the nozzle are calculated backward from the ultimate proportions of ceria/palladium desired on the surface taking into consideration the breakdown reaction equations of the precursor particles, in the instance of cerium carbonate: $Ce_2(CO_3)_x \cdot H_2O \rightarrow Ce_2O_3 + 3CO_2 + XH_2O$ and $Ce_2O_3 + \frac{1}{2}O_2 = 2CeO_2$; in the instance of palladium hydroxoxide: $Pd(OH)_x \rightarrow PdO_x + H_2O$ and $PdO_x \rightarrow Pd + XO_2$.

The photomicrographs of FIGS. 3A and 3B illustrate a metal surface coated with $Ce_2O_3$ and palladium particles deposited in accordance with the invention. In FIG. 3A and FIG. 3B a metal surface is coated with a mixture of $CeO_2$ and palladium particles in which 90% of the particles are less than 1 micron in size and 10% of the particles are in the size range between 1 micron and 3 microns. It is understood that the range stated is approximate and may vary, although the preferred embodiment of the invention is a substrate surface coated with particles in a size, or sizes within the range noted, the smaller the surface particles, the better. The coating adheres to the surface and provides desirable catalyst properties. As an example, the relationship of the metal oxide to the noble metal particles deposited by the thermal spray onto the substrate is in the ratio of approximately 10% noble metal to 90% metal oxide by weight. The preferred proportion of noble metal particles is in the range of 10% or less by weight and the proportion of metal oxide particles is approximately the remainder, 90% or greater by weight, and vice versa. The proportions and ratios stated are subject to design preferences, intended purpose and experimentation with regard to a particular catalyst combination and its application.

Figure 4:
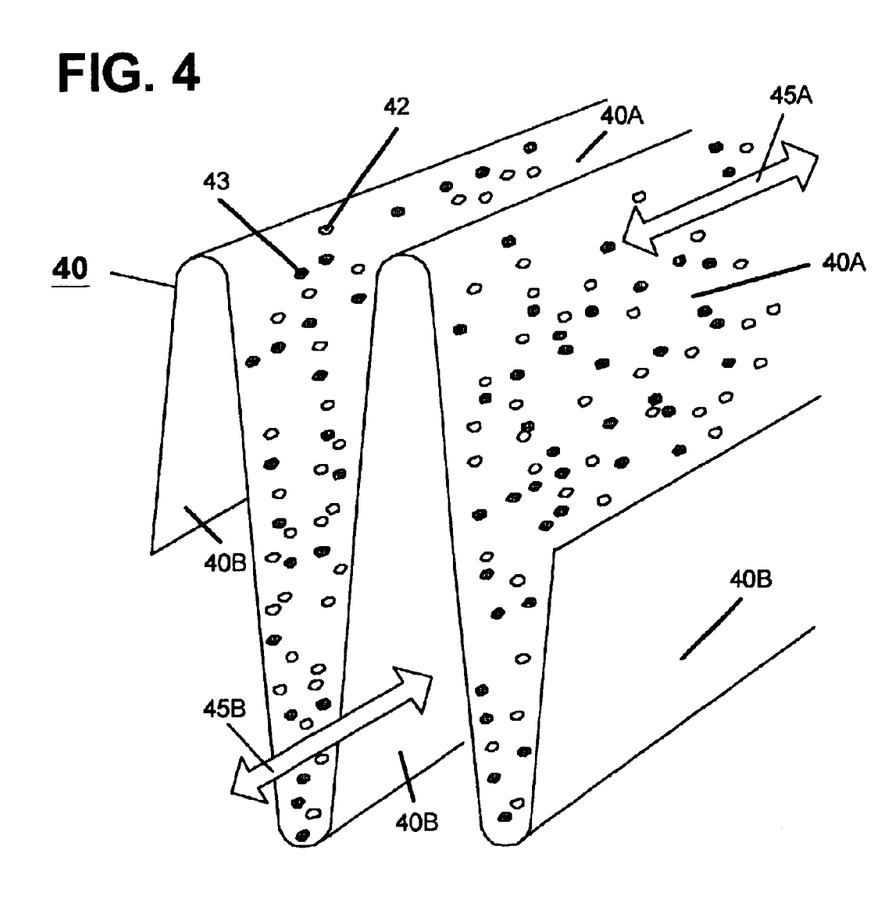
FIG. 4 represents in perspective a section of laminar flow micro channels in a heat exchange/reaction chamber with catalyst coatings of the invention on the opposite sides of a wavy plate separator, as used in a micro-component reactor assembly.

FIG. 4 is a representation of a section of a wavy plate or separator in a micro-component reactor processed in accordance with the invention. In this embodiment, a shaped wavy plate 40 has two opposite sides 40A and 40B, respectively exposed to laminar fluid flows 45A and 45B in a heat exchanger/reactor assembly such as described in U.S. application for patent Ser. No. 09/627,267 referenced above. In an example, one side 40A of the wavy plate is coated in accordance with the process herein with a catalyst material of platinum 42 and ceria 43 to provide a reactor chamber, for example, to promote a steam reforming reaction in fluid flow 45A that may be generally characterized as: Hydrocarbon Fuel+$H_2O \rightarrow H_2 + CO_2 + H_2O + CO$. Maintenance of the steam reforming reaction requires a sustained 700° C. temperature for the catalytic reaction that is provided by an exothermic reaction in fluid flow 45B of a mixture of combustible materials, such as fuel cell off gas and/or gasoline in a mixture with air on the opposite side 40B of the wavy plate.

The invention is useful in the production of micro-component assemblies used as heat exchangers or reaction chambers in various chemical reaction processes. Coatings produced by the invention are adaptable to separator elements used in such assemblies where separate fluid flows pass on opposite sides of a separator and different catalytically induced reactions occur on opposite sides of the separator. In examples, metal alloy substrates, such as a plate or foil shim with a thickness of approximately 60 micrometers, 100 micrometers, or more are cleaned and prepared for surface treatment, for example, by washing in trichloroethylene and ethanol and rinsing with deionized water. The surface may be grit blasted to increase roughness to a range of about 5 micrometers.

Figure 1B:
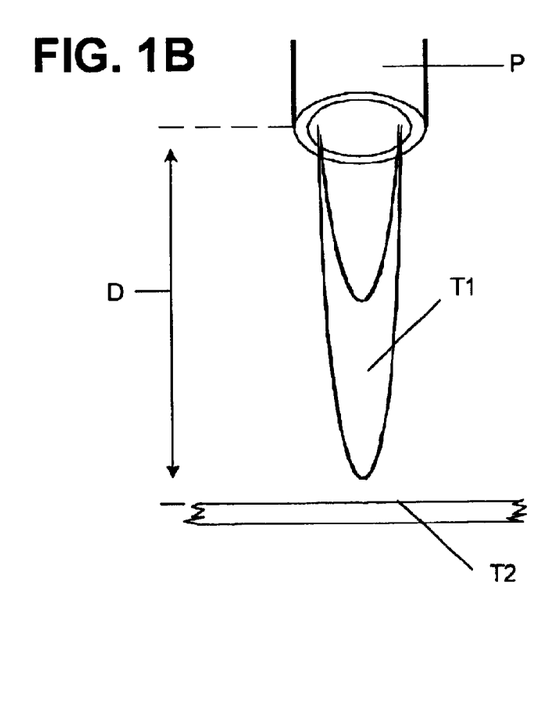
FIG. 1B is a representation of selected parameters incident to a plasma thermal spray process.

The coating is formed on the cleaned substrate by thermally spraying powders that are catalyst precursors directly onto the substrate by thermal spraying processes. In plasma spraying, for example, a temperature in the order of 30,000° C. may exist in the plasma, however, the peripheral regions of the spray where pyrolysis of the introduced powder occurs involve reaction temperatures in the range of approximately 2,000° C. to approximately 2,400° C. Multiple parameters are known to affect the thermal spraying process that are apparatus dependent, such as the power input, rate of particle introduction, distance of the nozzle and the substrate from the flame or plasma, and the like. Specific temperatures that induce the pyrolytic decomposition reaction of the invention are dependent on particle size of the introduced powder, its composition, the rate of introduction, and the porosity characteristics of the substrate (i.e., particle sizes on the substrate) ultimately desired after treatment. Many other factors encountered in thermal spraying differ according to the machine used. FIG. 1B illustrates several process parameters associated with an example. The distance D from the plasma source P in the treatment of a flat substrate will typically be from about 3 centimeters to about 15 centimeters. The plasma temperature T1 is dependent on the plasma power which is typically up to about 50 kW or more, the gas flow rate and the type of gas. The surface temperature of the substrate during the spray process T2 should be maintained at about less than 100° C.

A further consideration of using $Ce_2(CO_3)_3$ or cerium based compositions is the phase transition during deposition and decomposition of the particles to result in a coating on the surface, from $Ce_2O_3$ to $CeO_2$. This transition prevents the formation of large crystalline clusters on the surface. Overall, by introducing $Ce_2(CO_3)_3$ particles into the thermal spray, porous $CeO_2$ surface coatings are produced with nominal particle size distributions in the range smaller than approximately 3 micrometers and preferably, in the range smaller than approximately 1 micrometer, as a result of the decomposition process during coating: $Ce_2(CO_3)_3 + \frac{1}{2}O_2 \rightarrow 2CeO_2 + 3CO_2$.

As noted above, the flame temperature or plasma power required to achieve sufficient mechanical bonding of the catalyst precursor material to the substrate varies depending on equipment parameters, process rates, the spraying environment, and specific catalyst precursor material used. The appropriate temperature/power is process and material dependent, but should be sufficient for pyrolysis of the sprayed mixture. A catalyst coating may be formed on the substrate by using a mixture of catalyst precursors that decomposes to a metal oxide, a noble metal and/or a noble metal oxide.

The hydroxide, carbonate, or nitrate powders or particles used provide a large size precursor to produce a coating of small size particles. While useful particle or powder sizes are not limited in the invention, the normal size distributions for particles or powders sprayed in the invention are in the range of nominally greater than 10 micrometers, and range from approximately 15 micrometers up to approximately 200 micrometers. The mixture may be prepared by thorough mixing of the components. In an example, the mixture was separated into a consistent particle size less than 200 micrometers and greater than 10 micrometers by passing through an appropriately dimensioned sieve or mesh. As illustrated in the following example, a coating of catalytic material applied to a substrate will exhibit small particle size and high surface area characteristics particularly useful with micro-channel micro-component assemblies.

EXAMPLE I

The photomicrographs of FIG. 3A and FIG. 3B depict the following example. A substrate (a 5 centimeter by 10 centimeter shim) of a stainless steel alloy, Iconel® 625, with a thickness of approximately 100 micrometers, was cleaned by washing with trichloroethylene for approximately 30 minutes and ethanol for another approximately 30 minutes and then soaked in deionized water for approximately 60 minutes in an ultrasonic cleaner. The surface of the cleaned shim was enhanced by grit blasting using alumina particles of approximately 220 mesh size to obtain a roughness of several micrometers. The flat surface of the shim was coated by a plasma spray of precursors that produced the mixture of ceria and palladium shown in the figures.

Having described the invention in detail, those skilled in the art will appreciate that, given the present disclosure, modifications may be made to the invention without departing from the spirit of the inventive concept herein described. Rather, it is intended that the scope of the invention be determined by the appended claims.

I claim:

1. A method for depositing a catalyst coating of small size metal oxide and noble metal particles onto the surface of a substrate comprising directing a thermal spray of a powder of large size particles principally comprising 1) one or more than one powder composition selected from the group consisting of metal hydroxides, metal carbonates, and metal nitrates capable of decomposing of metal oxide and 2) one or more than one powder composition selected from the group consisting of noble metals, noble metal hydroxides, noble metal carbonates, and noble metal nitrates capable of decomposing to a metal onto the surface of the substrate such that the powder decomposes by pyrolysis to small size metal oxide and noble metal particles that bond to the substrate surface.

2. A method for depositing a catalyst coating of metal oxide/noble metal particles in the nominal diameter size distribution range of <3 micron, onto the surface of a substrate comprising directing a thermal spray of a powder of large size particles principally comprising 1) one or mare than one powder composition selected from the group consisting of metal hydroxides, metal carbonates, and metal nitrates capable of decomposing to a metal oxide and 2) one or more than one powder composition selected from the group consisting of noble metals, noble metal hydroxides, noble metal carbonates, and noble metal nitrates capable of decomposing to a metal onto the surface of the substrate such that the powder decomposes by pyrolysis to produce metal oxide and noble metal particles in the nominal diameter size distribution range of <3 microns that bond to the substrate surface.

3. A method for depositing a metal oxide/noble metal catalyst onto the surface of a substrate comprising directing a thermal spray of a powder of large size particles in a nominal diameter size distribution range of <10 micrometers and principally comprising 1) one or more than one powder composition selected from the group consisting of metal hydroxides, metal carbonates, and metal nitrates capable of decomposing to a metal oxide and 2) one or more than one powder composition selected from the group consisting of noble metals, noble metal hydroxides, noble metal carbonates, and noble metal nitrates capable of decomposing to a metal directly onto the surface of the substrate such that the thermally sprayed powders respectively decompose by pyrolysis to produce metal oxide and noble metal particles in the nominal diameter size distribution range of <3 microns that bond to the substrate surface.

4. The method of claim 1, claim 2, or claim 3 wherein the powder is flame sprayed onto the surface of the substrate.

5. The method of claim 1, claim 2, or claim 3 wherein the powder is plasma sprayed onto the surface of the substrate.

6. The method of claim 1, claim 2, or claim 3 wherein the large size particles selected from the group of a metal hydroxide, metal carbonate, and metal nitrate particles and the large size particles selected from the group of a noble metal, noble metal hydroxide, noble metal carbonate, and noble metal nitrate are separately introduced into the thermal spray directed onto the surface.

7. The method of claim 1, claim 2, or claim 3 wherein large size particles selected from the group of a metal hydroxide, metal carbonate, and metal nitrate particles and large size particles selected from the group of a noble metal, noble metal hydroxide, noble metal carbonate, and noble metal nitrate are commingled and introduced as a powder mixture into the thermal spray directed onto the surface.

8. The method of claim 2 or claim 3 wherein the metal hydroxide, metal carbonate, or metal nitrate particle capable of decomposing to a metal oxide is a cerium powder composition.

9. The method of claim 8, wherein the cerium powder is introduced into a thermal spray and undergoes a phase transition whereby the surface coating includes a porous $CeO_2$ coating.

10. The method of claim 2 or claim 3 wherein the metal hydroxide, metal carbonate, or metal nitrate particle capable of decomposing to a metal oxide is an aluminum powder composition.

11. The method of claim 2 or claim 5 wherein the metal hydroxide, metal carbonate, or metal nitrate particle capable of decomposing to a metal oxide is a tin powder composition.

12. The method of claim 2 or claim 3 wherein the metal hydroxide, metal carbonate, or metal nitrate particle capable of decomposing to a metal oxide is a manganese powder composition.

13. The method of claim 2 or claim 3 wherein the metal hydroxide, metal carbonate, or metal nitrate particle capable of decomposing to a metal oxide is a copper powder composition.

14. The method of claim 2 or claim 3 wherein the metal hydroxide, metal carbonate, or metal nitrate particle capable of decomposing to a metal oxide is a cobalt powder composition.

15. The method of claim 2 or claim 3 wherein the metal hydroxide, metal carbonate, or metal nitrate particle capable of decomposing to a metal oxide is a nickel powder composition.

16. The method of claim 2 or claim 3 wherein the metal hydroxide, metal carbonate, or metal nitrate particle capable of decomposing to a metal oxide is a praseodymium powder composition.

17. The method of claim 2 or claim 3 wherein the metal hydroxide, metal carbonate, or metal nitrate particle capable of decomposing to a metal oxide is a terbium powder composition.

18. The method of claim 2 or claim 3 wherein the noble metal hydroxide, carbonate, or nitrate particle capable of decomposing to a metal is a palladium powder composition.

19. The method of claim 2 or claim 3 wherein the noble metal hydroxide, carbonate, or nitrate particle capable of decomposing to a metal is a platinum powder composition.

20. The method of claim 2 or claim 3 wherein the noble metal hydroxide, carbonate, or nitrate particle capable of decomposing to a metal is a ruthenium powder composition.

21. The method of claim 2 or claim 3 wherein the noble metal hydroxide, carbonate, or nitrate particle capable of decomposing to a metal is a rhodium powder composition.

22. The method of claim 2 or claim 3 wherein the noble metal hydroxide, carbonate, or nitrate particle capable of decomposing to a metal is a silver powder composition.

23. The method of claim 2 or claim 3 wherein the noble metal hydroxide, carbonate, or nitrate particle capable of decomposing to a metal is a iridium powder composition.

24. The method of claim 2 or claim 3 wherein the noble metal hydroxide, carbonate, or nitrate particle capable of decomposing to a metal is a gold powder composition.

25. A catalytic surface produced in accordance with claim 1, claim 2, or claim 3 composing a coating of substantially uniform size particles of the groups of: a) one or more than one of cerium oxide, aluminum oxide, tin oxide, manganese oxide, copper oxide, cobalt oxide, nickel oxide, praseodymium oxide and terbium oxide particles; and b) one or more than one of ruthenium, rhodium, palladium, silver, iridium, platinum and gold particles, bonded to a substrate wherein the size distribution or the nominal diameters of the particles is in the range of <3 microns.

26. The catalytic surface of claim 25 wherein the coating particles are in the nominal diameter size distribution range of <1 micron.

* * * * *